June 18, 1968  H. S. CLARK  3,388,603
ENGINE
Filed Dec. 6, 1965  2 Sheets-Sheet 2

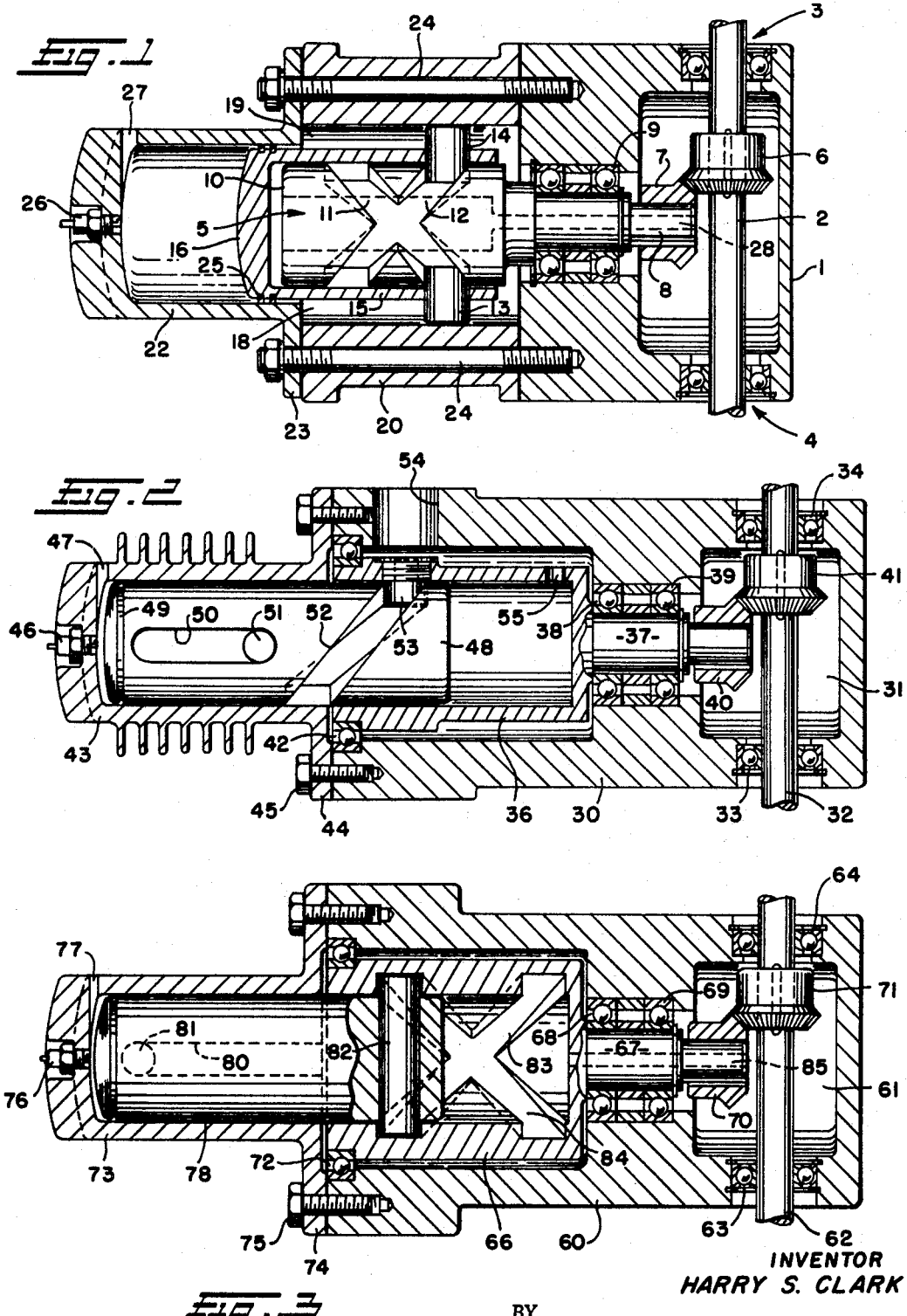

INVENTOR
HARRY S. CLARK

BY Oberlin, Maky & Donnelly
ATTORNEYS

United States Patent Office 3,388,603
Patented June 18, 1968

3,388,603
ENGINE
Harry S. Clark, Rte. 3, Delaware, Ohio 43015
Filed Dec. 6, 1965, Ser. No. 511,840
7 Claims. (Cl. 74—57)

ABSTRACT OF THE DISCLOSURE

An engine, pump or the like comprising a cylinder having a cylindrically elongated piston reciprocally mounted therein, a cylindrically elongated axially fixed rotor in close telescopic relation with said piston, and cylindrical cam drive means interconnecting the rotor and piston operative to rotate the rotor on reciprocation of the piston or vice versa; several forms of the invention utilizing a hollow rotor with a vent passage at the inner end thereof, some extending axially of the rotor into a gear case.

This invention relates generally as indicated to an engine and more particularly to a heat engine of simplified construction finding particular utility as an internal combustion engine, compressor, or pump.

Internal combustion engines and reciprocating pumps or compressors conventionally use a crankshaft and connecting rods to convert the reciprocating motion of the piston to rotary motion of a shaft and vice versa. However, crankshafts and connecting rods produce an out of balance condition limiting the speed at which the engine may run. Moreover, the crank also creates side thrust which produces extreme wear on the piston and creates out of roundness in the cylinder and piston itself. Bronze or babbitt type bearings usually required by the crank type engine to maintain such wear to a minimum are, of course, costly and require to be carefully installed. There are, of course, many inherent disadvantages in the conventional internal combustion engine.

It is accordingly a principal object of the present invention to provide a heat engine which will eliminate many of these disadvantages and at the same time be of a more simplified construction.

Another principal object is the provision of a heat engine utilizing a cylindrical cam to convert the reciprocating motion of the piston to rotary motion of a drive shaft, and vice versa in the case of a pump or compressor.

Another object is the provision of an engine wherein the gear train is isolated completely from the cylinder or combustion end of the engine thus avoiding dilution of engine oil in the gear train by fuel entering the oil through the piston rings.

A further object is the provision of a compressor design wherein an extremely long stroke may be utilized for the compression of gas or liquid to a high pressure, and in any event accomplish in a single long stroke what would ordinarily be required to be accomplished by a multi-stage compressor.

Yet another object is the provision of a heat engine or compressor of highly simplified design and construction.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but one of a few of the various ways in which the principles of the invention may be employed.

In said annexed drawings:

FIG. 1 is a longitudinal section of one form of the present invention illustrating a simple engine or compressor wherein the piston itself carries the cylindrical cam followers;

FIG. 2 is a longitudinal section of another form of the invention wherein the cylindrical cam is cut on the piston itself;

FIG. 3 is a longitudinal section of a further form of the present invention wherein the cylindrical cam is cut on a cup-shaped member surrounding the piston;

Figure 4:
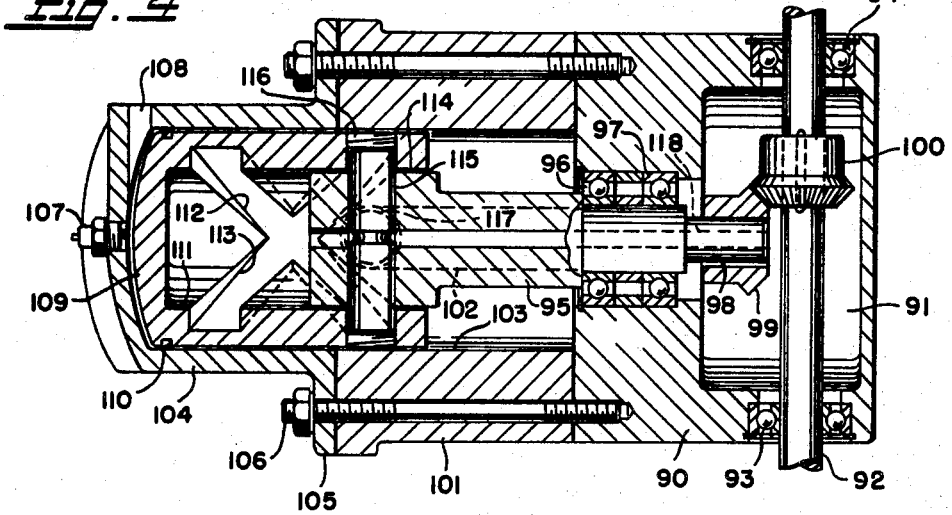
FIG. 4 is a longitudinal section of a still further embodiment of the present invention wherein the cylindrical cam is cut internally on the piston.

Referring now to the annexed drawings and more particularly to the embodiment of the invention shown in FIG. 1, a suitable gear case 1 houses drive shaft 2 carried by bearings 3 and 4. Such shaft 2 is connected to axially rotatable cylindrical cam member 5 through beveled gears 6 and 7 with the gear 6 being keyed to the shaft 2 and the gear 7 in mesh therewith being keyed to projection 8 on the cam member 5 projecting into the housing 1. The rotary cam 5 is supported by combination radial and thrust bearings 9 which are slightly axially spaced and the cam member is thus journalled in the gear housing 1.

The major portion 10 of the cam member 5 projects from the gear housing 1 and includes therein cam tracks 11 and 12 which may be of substantially identical configuration although one may be deeper than the other, but 180° apart. The cam tracks 11 and 12 cooperate with diametrically opposed cam followers 13 and 14, respectively, which are mounted in the cylindrical wall portion 15 of the piston 16. The followers also project into linear slots 18 and 19 in frame 20.

A cylinder 22 is provided with a flanged end 23. Elongated fasteners 24 extend through such flanged end, through the frame 20 and into the housing 1 securely holding the cylinder to the frame to the housing. The cylinder 22 telescopes over the piston 16 and piston rings 25 are provided therebetween. A spark plug 26 is secured to the end of the cylinder as shown and a lateral passage 27 leads to suitable valving, not shown. A vent passage 28 extends axially through the cam member 5 and serves to prevent gas from being compressed between the cam member and the piston 16. This vent passage 28 is open to the main gear case and may be utilized to provide lubrication both to the cam track and to the portion of the inside of the piston where the cam itself contacts the piston and rotates therewithin.

In operation, when power is applied to the piston 16 through an explosion in the chamber 29, the piston is forced to the right as seen in FIG. 1 carrying the cam followers 13 and 14 therewith. The slots 18 and 19 keep the piston 16 as well as the followers 13 and 14 from rotating about the axis of the piston and cam. However, since the inner end of the followers engage the slots 11 and 12, they force the cam 5 to turn axially or to rotate and thus through the gears 6 and 7 to turn drive shaft 2. A flywheel, not shown, may be mounted on the shaft 2 and would provide enough inertia to the cam to move the piston back to the beginning of the stroke and this would be the exhaust stroke in a four-cycle system or the next power stroke in a two-cycle system. The valving may, of course, be operated from the drive shaft 2 and it will be understood that more than one piston-cylinder-cam may be provided drivingly connected to the shaft 2 and arranged to operate in a particular sequence. The cam tracks 11 and 12 are designed to distribute the linear movement load of the piston 16 evenly between the followers 13 and 14 and it will be understood that the cam tracks may be designed to obtain optimum expansion velocity movement of the piston 16. Accordingly, the pitch of the cam tracks may be varied over the length of the stroke.

The embodiment of FIG. 1 may be utilized as a compressor simply by applying power to the shaft 2 and which through beveled gears 6 and 7 will cause the cam 5 axially to rotate. This will in turn cause the cam followers to move in the slots 18 and 19 forcing the piston to the outer end of the cylinder compressing gas therein. It will be appreciated that the length of the cam slots as well as the cam member 5 and the corresponding length of the piston and cylinder will determine the stroke of the compressor and accordingly an extremely long stroke may be provided compressing a very large volume of gas to an extremely small volume.

It will be appreciated that there is no side thrust on the piston causing wear to either the piston or the cylinder and since the cam itself is rotating about its own axis, it is completely in balance and capable of extremely high speeds.

Referring now to the embodiment shown in FIG. 2, a housing 30 is provided with a gear case 31 through which extends drive shaft 32 journalled at 33 and 34. A cam follower cup 36 is provided with an axially projecting shaft 37 which is journalled in the housing 30 by slightly spaced combination radial and thrust bearings 38 and 39. A bevel gear 40 on the projecting end of the shaft portion 37 is in mesh with bevel gear 41 keyed to the drive shaft 32. The outer end of the cam follower cup 36 is also journalled at 42 in the housing 30 to maintain the same precisely aligned and against axial movement. A cylinder 43 having flanged end 44 is secured to the housing through fasteners 45 and is provided at its outer end with spark plug 46 and lateral passage 47 leading to suitable valving. The interior of the cylinder 43 is axially aligned with the interior of the cam follower cup 36 and mounted for reciprocating movement therein is piston 48.

The piston 48 is provided with a piston ring 49 at the outer end, an axial slot 50 which engages pin 51 fastened in the wall of cylinder 43, and a cylindrical cam slot 52. The cam slot 52 engages follower 53 removably secured to the cup member 36. An access port 54 is provided in the housing 30 permitting the follower to be removed. A vent passage 55 is provided in the bottom of the axially rotatable cup 36.

The pin 51 and slot 50 keep the piston 48 from rotating and accordingly on the power stroke of the piston, the cup 36 will be caused to rotate rotating the shaft 32. As a compressor, the shaft 32 will be caused to rotate and the piston 48 will then reciprocate within the cylinder.

In the embodiment of FIG. 3 there is provided a housing 60 having a gear case 61 with a drive shaft 62 journalled therethrough by bearings 63 and 64. A cup-shape member 66 is provided with an axial shaft extension 67 journalled in the housing 60 by slightly spaced radial and thrust bearings 68 and 69. Bevel gear 70 on the projecting end of the shaft portion 67 is in mesh with bevel gear 71 keyed to the drive shaft 62. The outer end of the cup-shape member 66 is journalled also at 72 in the housing 60.

Cylinder 73 is provided with a flanged end 74 secured by fasteners 75 to the housing 30 and the outer end of such cylinder is also provided with a spark plug 76 and a lateral passage 77 leading to suitable valving. The cylinder 73 is axially aligned with the interior of the cup-shape member 66 and a piston 78 is mounted for reciprocation in the bore thus provided. The piston 78 includes a piston ring 79, an axial slot 80 engaging pin 81 fastened in the cylinder wall, and a transverse follower pin 82. The projecting portions of the follower pin 82 engage within cam tracks 83 and 84 cut on the inside of the cup 66. An axial vent passage 85 is provided extending between the interior of the cup-shape member 66 and the gear case 61 and may serve the same purpose as the vent passage 28 in the FIG. 1 embodiment.

Since the piston 78 is kept from rotating by the pin 81 and slot 80, axial movement caused by explosion created by the spark plug 76 will cause the cup-shape member to rotate converting the reciprocating motion of the piston to rotary motion of the shaft 62. Again, suitable valving, not shown, may be operated by the shaft 62 and a flywheel may be provided.

In the FIG. 4 embodiment, a housing 90 is provided with a gear case 91 having drive shaft 92 journalled therethrough by the bearings 93 and 94.

A rotary follower 95 is journalled in spaced radial and thrust bearings 96 and 97 in the housing 90 and the projecting end 98 in the gear case 91 has a beveled gear 99 mounted thereon in mesh with bevel gear 100 keyed to drive shaft 92.

A frame 101 provided with an axially extending slot 102 surrounds the rotary member 95 and is provided also with a center bore 103. A cylinder 104 has a flanged end 105 which is secured to the frame 101 and the housing 90 by elongated fasteners 106. The outer end of the cylinder 104 includes a spark plug 107 and a lateral passage 108 leading to suitable valving. The interior of the cylinder 104 is axially aligned with the bore 103 in the frame 101 and a piston 109 is mounted therein having a piston ring 110 thereon. The piston 109 is cup-shaped and provided with an interior bore 111 having cam tracks 112 and 113 cut therein. The interior bore 111 of the piston 109 telescopes over the enlarged diameter portion 114 of the rotary member 95 and a transverse follower pin 115 extends therethrough and on opposite sides into the respective slots 112 and 113. Diametrically opposed removable access ports 116 permit assembly and disassembly of the pin 115, piston 109 and the member 95. A pin 117 projecting from the piston 109 into the slot 102 serves to keep the piston from rotating as it reciprocates within the cylinder and frame. A vent passage 118 extends through the member 95 and as indicated the pin 115 may be provided with a groove forming a portion of such vent passage.

Again, a flywheel may be provided on the shaft 92 to provide the desired inertia and such shaft may also control the valving, not shown. When the spark plug 107 ignites the combustible mixture within the chamber of the cylinder 104, the piston 109 is driven axially therealong and the piston, held against rotation by the pin 117 and slot 102, will then cause the member 95 to rotate because of the engagement between the pin 115 and the cam slots 112 and 113.

Figure 5:
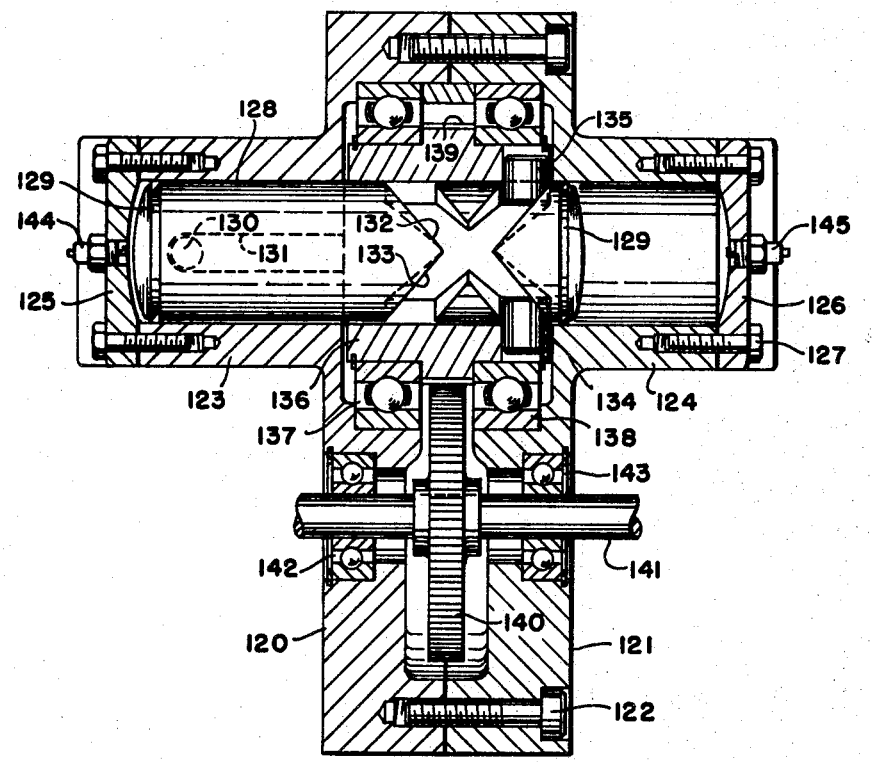
FIG. 5 is a longitudinal section of yet another form of the invention which finds particular utility as a compressor or pump.

Referring now to FIG. 5, there is illustrated yet another form of the invention which is especially adaptable as a compressor or pump. In such embodiment the housing is formed by mating halves 120 and 121 secured together by fasteners 122. Each housing half includes aligned projecting cylinder portions as seen at 123 and 124 which are closed by respective cylinder heads 125 and 126 held in place by fasteners 127. A piston 128 extends axially between the cylinders and is provided with piston rings 129 at each end within the respective cylinders. It is noted that the cylinder 123 may be slightly axially longer than the cylinder 124 and a pin 130 projects from the piston into slot 131 in the cylinder 123 to keep the piston from rotating upon its axis. Cylindrical cam tracks 132 and 133 are provided in the piston 128 and within such slots are diametrically opposed cam follower pins 134 and 135, respectively. Such pins are mounted in cam follower holder 136 which is journalled in the housing formed by the mating parts 120 and 121 within combination radial and thrust bearings 137 and 138. Such bearings are axially spaced and between such bearings the holder 136 is provided with a drive gear 139 in mesh with spur gear 140 on shaft 141 journalled at 142 and 143 in the respective housing parts.

If this embodiment is to be utilized as an opposed cylinder internal combustion engine, spark plugs 144 and 145 may be provided in the cylinder heads and, of course, lateral passages leading to suitable valving, not shown, will also be provided which valving may be controlled from the shaft 141. Again, a flywheel may also be provided on the shaft. A power stroke on one end of the piston constitutes a compression stroke on the opposite end. Since the piston is held against axial rotation, the holder 136 will be caused to rotate driving the shaft 141 axially parallel to the piston through the gear train. It will, of course, be appreciated that additional gearing may be provided to provide for a reduction in speed between the rotation of the holder 136 and the rotation of the shaft 141. The embodiment of FIG. 5 has special application in small two-cycle engines, such as are widely used in lawn mowers or outboard motors.

When used as a compressor, the shaft 141 becomes the input shaft and drives the holder 136 through the gearing on the holder and the spur gear 140. The rotation of the holder 136 causes the piston 128 to reciprocate back and forth in the cylinders and with suitable porting, a highly efficient compressor or pump is provided wherein motion in both direction of the linearly travelling piston are utilized as a compression stroke. With appropriate porting, the embodiment of FIG. 5 may be utilized as a two-stage compressor.

It is here noted that in the embodiments of the invention employing two crossing cam tracks, One may be cut slightly deeper than the other to preclude cross-over and thus reversal of movement of the parts. Moreover, in each embodiment it is apparent that the engine may readily be disassembled and the parts subject to most wear replaced.

It can now be seen that there is provided a highly simplified heat engine which may be utilized as an internal combustion engine, compressor or pump, and in which a cylindrical cam track converts the reciprocating motion of the piston into rotary motion and vice versa.

Other modes of applying the principles of the invention may be employed, change being made as regards the details described, provided the features stated in any of the following claims or the equivalent of such be employed.

I, therefore, particularly point out and distinctly claim as my invention:

1. An engine, pump and the like comprising a cylinder having a cylindrically elongated piston reciprocally mounted therein and forming therewith a piston-cylinder assembly, a cylindrically elongated axially fixed rotor in close telescopic relation with said piston, said piston being slide guided for reciprocation by both said cylinder and said rotor, means operative to preclude axial rotation of said piston, cylindrical cam drive means including a cylindrical cam slot and a transaxially extending follower drivingly interconnecting said piston and said rotor, said cylindrical cam drive means being operative to convert reciprocation of said piston to rotation of said rotor and vice versa, a drive shaft, and gearing operatively connecting said shaft and rotor.

2. An engine, pump and the like as set forth in claim 1 wherein said rotor includes at one end an enlarged hollow cylindrical portion slide guiding said piston for reciprocation, a vent passage in the bottom of said hollow cylindrical portion, and a gear case at the opposite end of said rotor, said rotor projecting into said gear case and being operatively connected therein by said gearing to said drive shaft.

3. An engine, pump and the like as set forth in claim 2 wherein said vent passage extends axially through the opposite end of said rotor into said gear case.

4. An engine pump and the like as set forth in claim 1 wherein said cylindrical cam drive means includes two cylindrical cam slots of the same cam profile, one being of greater depth than the other, and diametrically opposed followers for each slot.

5. An engine, pump and the like as set forth in claim 4 wherein said slots are in the exterior wall of said piston, and said followers are mounted in said rotor.

6. An engine, pump and the like as set forth in claim 4 wherein said piston is hollow, said slots being on the interior wall of said piston, and said followers being mounted in said rotor.

7. An engine, pump and the like as set forth in claim 4 wherein said rotor includes at one end an enlarged hollow cylindrical portion, said slots being in the interior wall of said cylindrical portion, and said followers being mounted in said piston.

References Cited
UNITED STATES PATENTS

| | | | |
|---|---|---|---|
| 766,410 | 8/1904 | Alger | 74—57 X |
| 1,197,591 | 9/1916 | Bargery | 74—57 X |
| 1,867,504 | 7/1932 | Franklin | 74—57 |
| 2,262,963 | 11/1941 | Procissi | 74—58 |

FRED C. MATTERN, Jr., *Primary Examiner.*

W. S. RATLIFF, *Assistant Examiner.*